(12) United States Patent
Dhawan et al.

(10) Patent No.: US 12,299,159 B2
(45) Date of Patent: *May 13, 2025

(54) PROTECTION FOR RESTRICTED ACTIONS ON CRITICAL RESOURCES

(71) Applicant: Microsoft Technology Licensing, LLC, Redmond, WA (US)

(72) Inventors: Anuj Dhawan, Redmond, WA (US); Brijesh Bhupendra Desai, Redmond, WA (US); Kameshwar Jayaraman, Redmond, WA (US); Ayla Kol, Sammamish, WA (US); Amit A. Bapat, Sammamish, WA (US); Qi Cao, Redmond, WA (US); Steven Jay Lieberman, Sammamish, WA (US); Ganesh Pandey, Redmond, WA (US); Parul Manek, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 226 days.

This patent is subject to a terminal disclaimer.

(21) Appl. No.: 18/070,059

(22) Filed: Nov. 28, 2022

(65) Prior Publication Data
US 2023/0093731 A1 Mar. 23, 2023

Related U.S. Application Data

(63) Continuation of application No. 17/166,752, filed on Feb. 3, 2021, now Pat. No. 11,520,918.

(51) Int. Cl.
*G06F 21/64* (2013.01)
*G06F 21/60* (2013.01)
(Continued)

(52) U.S. Cl.
CPC ........ *G06F 21/6218* (2013.01); *G06F 21/602* (2013.01); *G06F 21/604* (2013.01);
(Continued)

(58) Field of Classification Search
None
See application file for complete search history.

(56) References Cited

U.S. PATENT DOCUMENTS 8,892,875 B1 * 11/2014 Baldwin ............... H04L 9/3268
713/188
11,520,918 B2 * 12/2022 Dhawan .............. G06F 21/6218
(Continued)

OTHER PUBLICATIONS

Secure Overlay Cloud Storage with Access Control and Assured Deletion. Tang. IEEE. (Year: 2012).*
(Continued)

*Primary Examiner* — Venkat Perungavoor
(74) *Attorney, Agent, or Firm* — Schwegman Lundberg & Woessner, P.A.

(57) ABSTRACT

Methods, systems, and computer programs are presented for protecting restricted actions on encryption keys that control the management of data stored by a service provider. In some implementations, a system of the service provider receives a request to generate a data encryption policy (DEP) for data stored by the system of the service provider for a customer, the request including a reference to a customer key and an availability key. The customer key and the availability key are root keys for encrypting a data encryption key. The data encryption key is used to encrypt the data stored by the service provider for the customer. Further, destructive changes to the availability key require receiving an approval from an account of the service provider. The system of the service provider validates the DEP. The system of the service provider stores the DEP based on the validation.

20 Claims, 8 Drawing Sheets

(51) Int. Cl.
  *G06F 21/62*  (2013.01)
  *G06F 21/71*  (2013.01)
  *H04L 9/16*  (2006.01)
  *H04L 9/08*  (2006.01)
  *H04L 9/14*  (2006.01)

(52) U.S. Cl.
  CPC ............... *G06F 2221/2113* (2013.01); *G06F 2221/2141* (2013.01)

(56) References Cited

U.S. PATENT DOCUMENTS

2016/0156636 A1\*  6/2016  Tan .................. H04W 4/80
                                                    726/4
2019/0318102 A1\*  10/2019  Araya ................ H04L 9/0891

OTHER PUBLICATIONS

Time saving protocol for data accessing in cloud computing. Namasundra. IET Comm. (Year: 2017).\*

Study and Scope of Signcryption for Cloud Data Access Control. Debnath. (Year: 2019).\*

\* cited by examiner

PROTECTION FOR RESTRICTED ACTIONS ON CRITICAL RESOURCES

CROSS-REFERENCE TO RELATED APPLICATIONS

This application is a Continuation Application under 35 USC § 120 of U.S. patent application Ser. No. 17/166,752, entitled "Protection for Restricted Actions on Critical Resources," filed on Feb. 3, 2021, and is herein incorporated by reference in its entirety.

TECHNICAL FIELD

The subject matter disclosed herein generally relates to methods, systems, and machine-readable storage media for protecting data stored by a service provider.

BACKGROUND

When customers use a cloud service (e.g., Software as a Service (SaaS)), customer critical data is stored by the service provider. The customer that is subscribed to the service owns various resources that are provisioned under the subscription (for example, the use of customer encryption keys for data stored in Microsoft Exchange Online or in Microsoft Azure cloud-storage service). In some cases, the customer provisions key vaults and encryption keys that are used for the encryption of their stored data.

However, the control of the encryption keys by the customer may result in a catastrophic event in the case of the customer losing the encryption keys or when a malicious user destroys or kidnaps the encryption keys.

What is needed is a way to protect the customer from an unintended loss of encryption keys which would result in the loss of the stored data.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
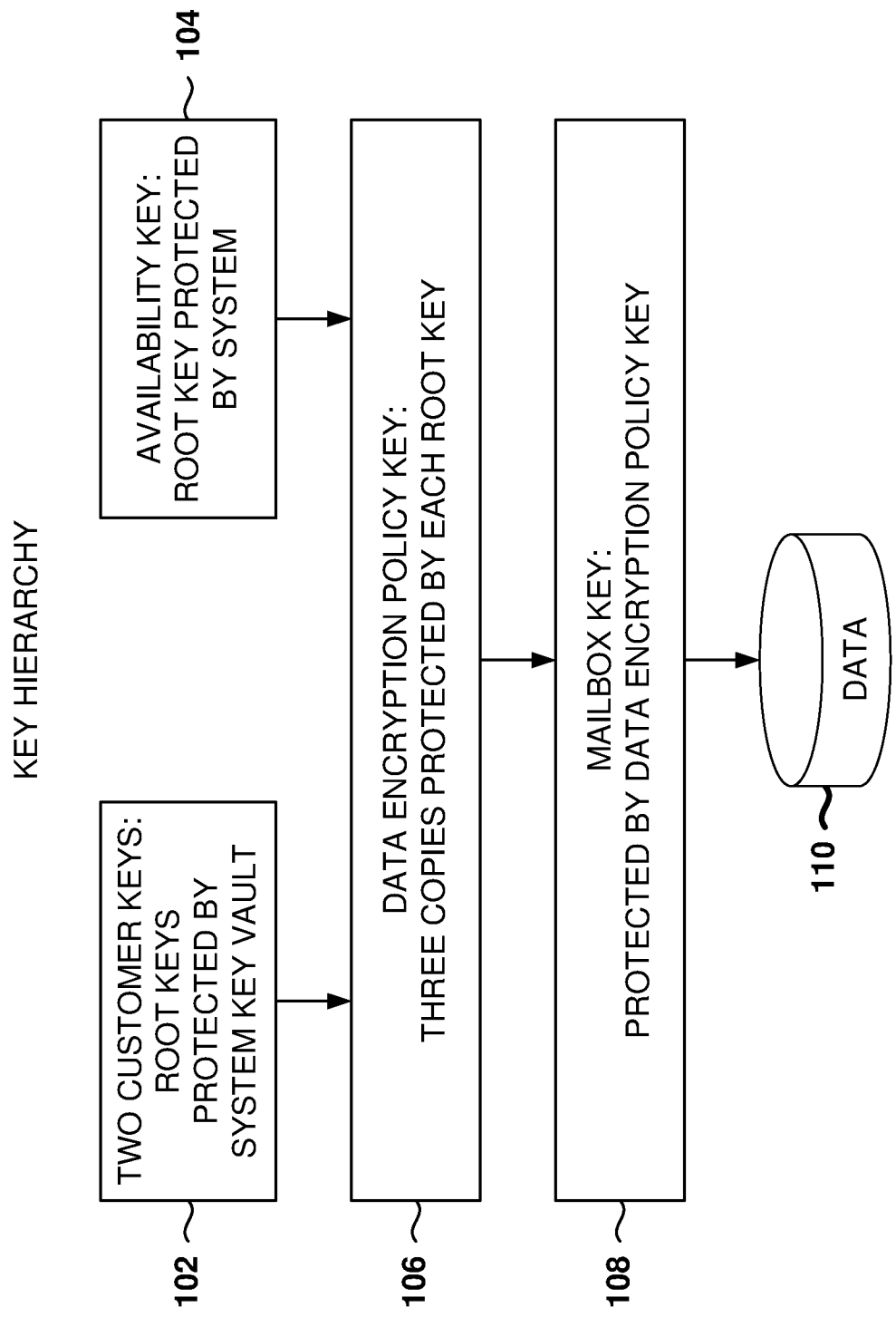
FIG. 1 shows an encryption-key hierarchy, according to some example embodiments.

Example methods, systems, and computer programs are directed to protecting restricted actions on encryption keys that control the management of data stored by a service provider. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

When customers manage encryption keys that control storage at a service provider, there is a possibility that, either by mistake or malicious use, the encryption keys could be lost, which would result in losing access to all the stored data. In order to protect against this type of error, a process is implemented where destructive actions on encryption keys (e.g., revoking access, removing the encryption keys) is subject to approval by a plurality of users. A customer that wishes to perform critical operations has to obtain approval from all the approvers, and the approval will give the customer a window of time in which the destructive operations can be performed.

For example, a customer may wish to delete encryption keys to purge the data and make sure the data is inaccessible. In one aspect, access to destructive actions on a high-value resource (e.g., the encryption key for encrypting/decrypting customer data) is available to a customer internal group of users that has no member by default. When an administrator wants access to the resource, the system implements a multi-stage approval process, which requires approval from several required individuals. Once approvals are granted, the administrator gets a time-bound membership in the group to access the high-value resource. The administrator can take destructive actions on the resource during the time the administrator is a member of the group (e.g., has access to the high-value resource).

During the creation of the resource, the resource administrator configures the resource to have multi-stage approval-based access. As part of the configuration, the resource administrator configures specific groups of people as approvers. Each group of approvers will have people with specific roles within the customer's organization. Further, the administrator configures the type of actions for which the approval will be required, as well as the duration of time for which the access would be granted.

Once the resource is setup for approval-based access for destructive actions, no one, not even the resource owner, can perform those actions without going through the approval process. When an administrator wants to perform the destructive action, the system initiates the approval workflow, which includes notifying the approvers about the request for access. Post expiry of the time bound access, the requestor has to again initiate an approval process before they can perform any destructive actions on the resource.

In some cases, to protect the instability of the service, the service provider also has an availability key to support service-related operations (e.g., moving stored data to a different location for load balancing). Further yet, in some cases, the approval process, for temporary access to the destructive operations, includes obtaining permission from the service provider to provide an additional level of security on customer data. In other cases, the customer does not give the approval capability to the service provider, allowing the customer to take full ownership of the management of the data, such as when storing critical data to which the customer does not want to give outside parties access.

The implementation allows for the service to have better availability as well as better protection against customer data loss, without compromising customers' concerns of not having ownership of all encryption root keys.

In some implementations, a system of the service provider receives a request to generate a data encryption policy (DEP) for data stored by the system of the service provider for a customer, with the request including a reference to the customer key and an availability key. The customer key and the availability key are root keys for encrypting a data encryption key. The data encryption key is used to encrypt the data stored by the service provider for the customer. Destructive changes to the availability key requires receiving an approval from an account of the service provider. The DEP includes references to the customer keys and the availability key, which are stored in customer-owned key vaults, and one or more internal data encryption keys. The system of the service provider validates the DEP. The system of the service provider stores the DEP based on the validation.

FIG. 1 shows an encryption-key hierarchy, according to some example embodiments. The key hierarchy is a sample implementation of services provided by Microsoft®.

Service encryption ensures that content at rest (e.g., as it is placed on permanent storage media) is encrypted at a service layer. The use of customer encryption keys, also referred to herein simply as keys, provides protection against viewing of data by unauthorized systems or personnel. In some cases, the primary purpose is to assist customers in meeting regulatory or compliance obligations for controlling root keys. Customers explicitly authorize Microsoft® 0365 services to use the customers' encryption keys to protect customer data at rest stored by cloud services, such as eDiscovery, anti-malware, anti-spam, search indexing, and so forth.

To protect a data encryption key (DEK), a root key is used to encrypt the DEK. This means that the root key may be used to decrypt an encrypt the DEK that is used to access the stored data. An availability key 104 is a root key generated when the data encryption policy is created for the customer and the availability key is also used to protect the DEK. In some example embodiments, the availability key 104 is managed by the service provider, but in other embodiments, the customer manages the availability key 104.

In some example embodiments, when setting up the service with the service provider, the customer creates two customer keys 102, which are two root keys protected in a key vault, which is a mechanism provided by the service provider to store secrets (e.g., the data encryption key).

The use of customer keys enhances the ability of organizations to meet compliance requirements that specify key arrangements with the cloud service provider. Thus, the customer provides and controls the root encryption keys for the data at-rest at the application level. If a customer decides to exit the service, the customer can revoke access to the customer keys. By revoking access to the customer keys, the data becomes unreadable by the service provider.

A DEP defines how encryption and decryption is performed for the data stored by the service provided, and the DEP includes the encryption hierarchy to encrypt the data using the customer keys or the availability key, which provides a layer of security to protect the data. A DEP key 106 is a key used to enforce the DEP, and the DEP key 106 is encrypted three times using each of the root keys 102, 104. Further, a mailbox key 108 is protected using the DEP key, and data 110 is stored on disk with the DEK. The policy includes metadata about how the encryption is managed and performed, including the use of the different keys. When a request is received, for writing or reading data, the DEP is used to obtain the DEK.

To decrypt the customer data 110, the DEK is needed, and to obtain the DEK, the DEP key 106 is decrypted, which may be done with one of the two customer keys 102 or with the availability key 104.

The availability key 104 may be used by the services in some cases. For example, in a multi-tenant environment, there are multiple processes running for managing the data, such as having mailboxes in different regions or data centers. Sometimes, the data needs to be load balanced along the different data centers so mailboxes have to be moved, and the service system utilizes the availability key to move the data, thereby enabling load balancing.

There have been cases where customers have inadvertently deleted the customer keys 102. In implementations without the availability key 104, this loss of the customer keys 102 results in data becoming inaccessible and the consequent disruption to the operations of the service.

Figure 2:
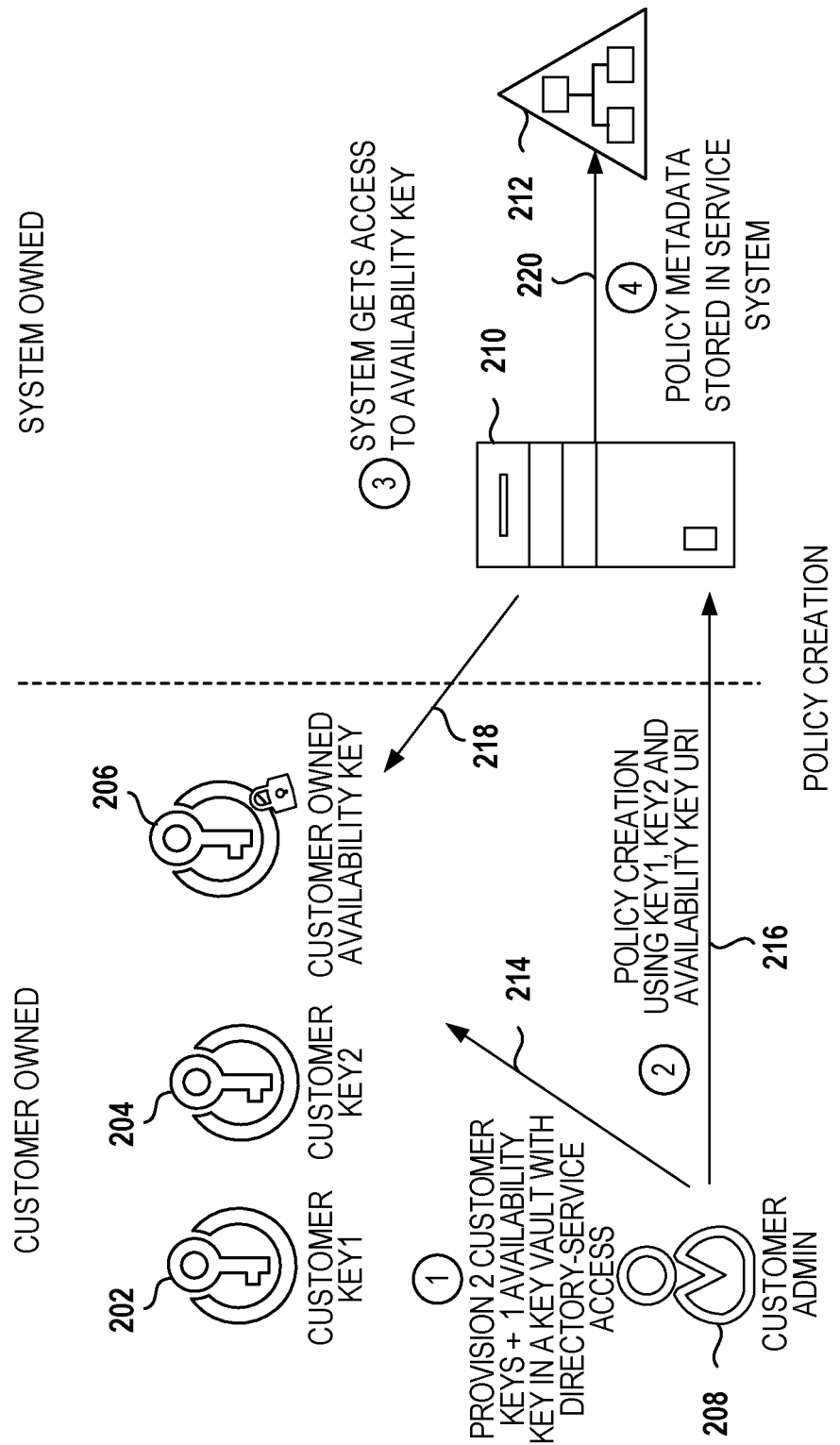
FIG. 2 illustrates the creation of a security policy for protecting customer-owned resources in a cloud service, according to some example embodiments

FIG. 2 illustrates the creation of a security policy for protecting customer-owned resources in a cloud service, according to some example embodiments. In some example embodiments, a role-based multi-user approval process is implemented to be able to perform any destructive operations on the key vault that holds the customer keys and the availability key. Some examples of destructive operations include deleting the key vault, deleting the customer root key, deleting the administrator key, deleting the encryption key, deleting the policy, and so forth.

In some example embodiments, the policy is in a form utilizing Azure Privileged Identity Management (PIM) to protect against unintended revocation of access to the availability key, but the same principles may be utilized for other cloud service providers. PIM is a service in Azure Active Directory that enables customers to manage, control, and monitor access to important resources in their organization. These resources include resources in Azure AD, Azure, and other Microsoft Online Services such as Microsoft 365 or Microsoft Intune. Azure Active Directory is Microsoft's enterprise cloud-based identity and access management solution, but other types of cloud access management may be utilized.

As part of the process, the key vault administrator wishing to perform restricted operations is required to get approvals from specific approvers within the customer organization. In some cases, the process also includes obtaining permission from one or more approvers from the service provider. For example, the service provider approver can confirm if the availability key is in use and the customer intent of purging their data.

FIG. 2 illustrates the process of creating the security policy. In this illustrated example, the customer creates the three root keys: customer key 202, customer key 204, and customer-owned availability key 206.

At operation 214, the customer administrator 208 provisions and configures the key vault and creates the availability key 206. In some example embodiments, three groups are set up to be approvers for the key vault access: workload administrators, compliance administrators, and a security group that includes service-provider administrators. It is noted that any modification to the policy will need approval from the approvers.

At operation 216, the customer administrator 208 sends a request to the system 210 of the service provider for creating the policy using the three root keys 202, 204, and 206.

At operation 218, the service provider analyzes the availability key and performs several checks, including: the availability key vault has been configured for access, there are zero or more required customer approvers, one or more approvers for the service provider, and the key vault is enabled for soft delete. If the conditions are met, the system 210 creates and stores 220 the policy metadata of the security policy 212.

The implementation of the security policy provides protection in two scenarios. First, when the customer unintentionally revokes access to the root keys and causes permanent data loss, the availability key accessible to the service provider, with the added approval-based protection, can be used to recover customer data in that scenario. Second, the security policy ensures that multiple services in a multi-tenant environment continue to operate without any service degradation due to the operations of other tenants in the same environment.

Figure 3:
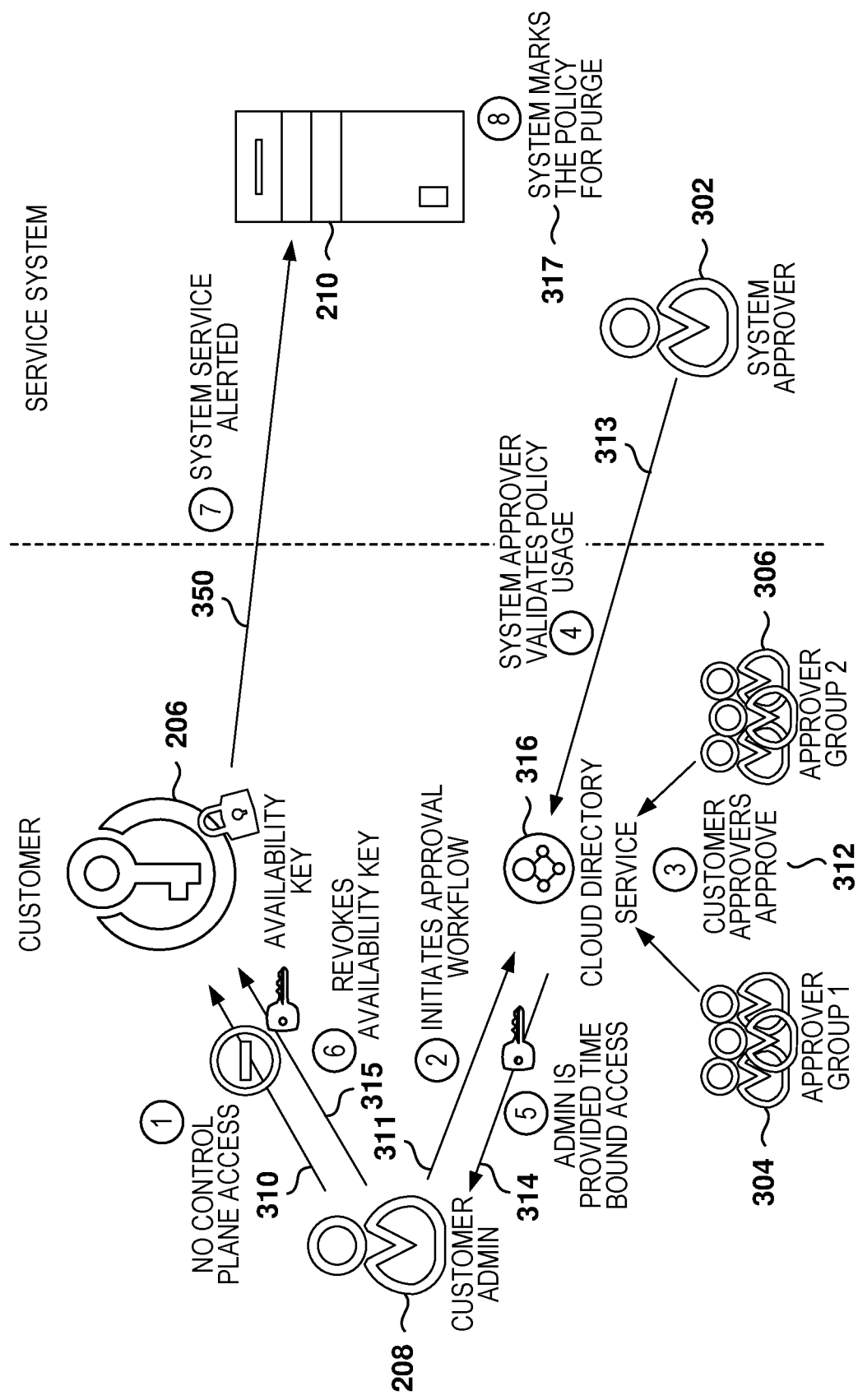
FIG. 3 shows the role-based approval workflow to grant access to the key vault, according to some example embodiments.

FIG. 3 shows the role-based approval workflow to grant access to the key vault, according to some example embodiments. In the illustrated example, the approval workflow corresponds to the customer setup described in FIG. 2. In this case, the customer wants to perform a data purge of the stored data so the customer wants to revoke the use of the availability key 206.

Without approval, no one has access 310 to revoke the availability key 206. At operation 311, the customer administrator 208 initiates the approval process to request access to revoke the availability key 206 via the cloud directory service 316. The cloud directory service 316 sends notifications to the approvers defined in the policy. In the illustrated example, the approvers include an approver group 304 and an approver group 306, and one approval from each group is required to continue the approval process.

The cloud directory service 316 monitors the approval from all the approvers and once all the required approvals are received (operation 312), the cloud directory service notifies the system approver 302 of the service provider.

The system approver 302 receives the request and performs several validations before approving the request. The validations include verifying if the request is for an availability key that belongs to a policy that is no longer in use. If the policy is in use, the system approver 302 confirms the customer intent to perform purge of the policy and associated customer data; if customer intent is to purge the data, the system approver 302 prepares internal systems for data purge.

Once the system approver 302 validates the request, the system approver 302 notifies (operation 313) the cloud directory service 316 that the request has been approved.

At operation 314, the customer administrator is provided with time-bound access the key vault to perform destructive-operations access to the customer owned key vault hosting the availability key 206.

At operation 315, the customer administrator 208 completes the destructive action on the availability key 206 (e.g., revoking the availability key 206). After the destructive action, the system service is notified at operation 350 (e.g., by the cloud directory service 316). At operation 317, the service system 210 marks the customer policy for purge.

Therefore, even if the customer owns the availability key, the service provider has to approve changes to the availability key. This provides extra protection to the customer against error (human or computer) by having the service provider validating the intent of the destructive actions. Thus, the customer is able to have complete control of the data, and the service provider does not have access to the availability key, but the customer benefits from the extra check provided by the service provider, which is an outside entity actively protecting against errors or malicious attacks.

Figure 4:
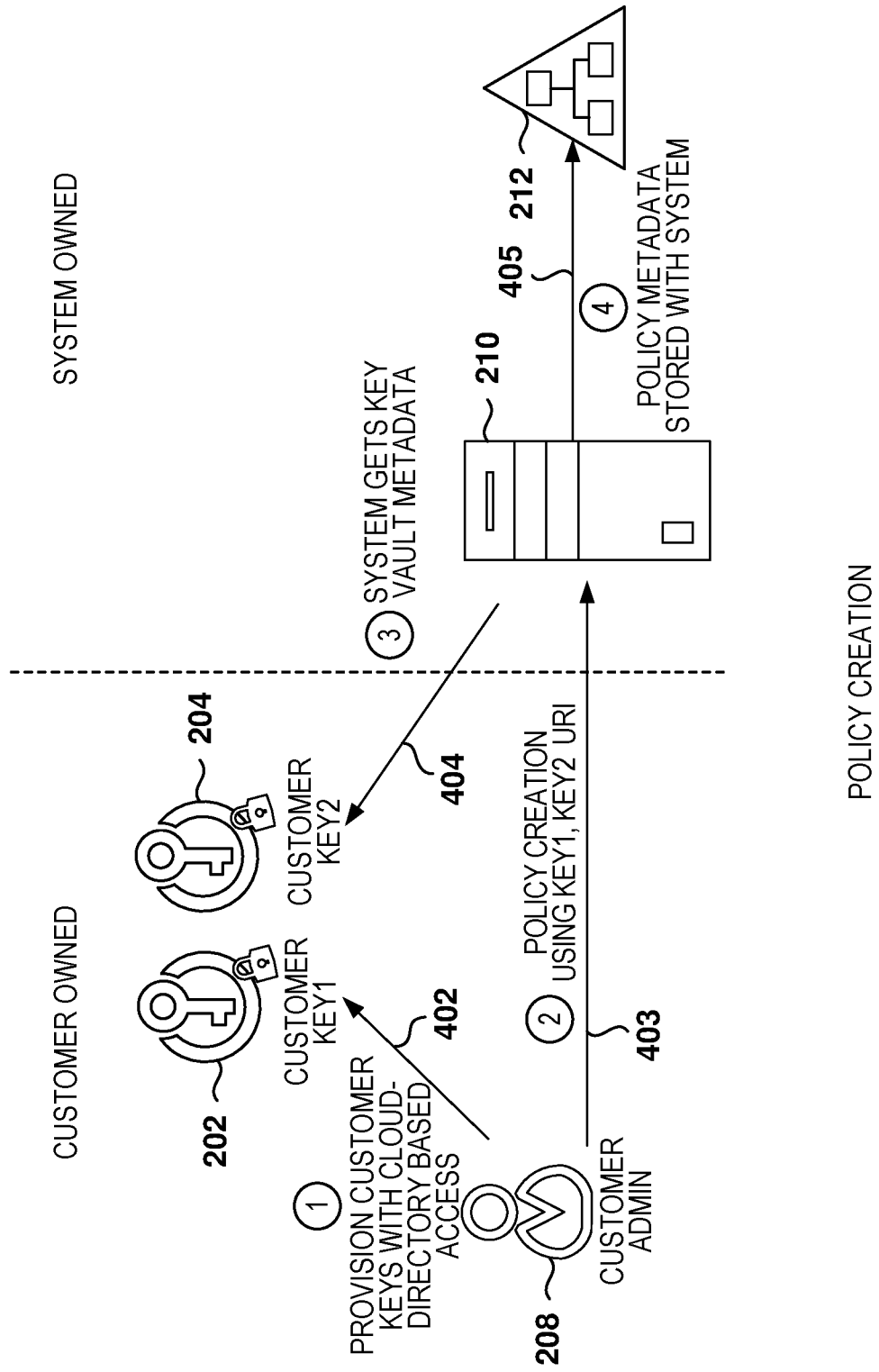
FIG. 4 illustrates the creation of the security policy for data encryption, according to some example embodiments.

FIG. 4 illustrates the creation of the security policy 212 for data encryption, according to some example embodiments. In the illustrated example, to customer root keys 202, 204 are created and there is no administrator key. However, the same principles may be utilized to create the additional administrator key within the security policy 212.

At operation 402, the customer administrator 208 provisions the key vaults and customer keys 202, 204 and enables the cloud-service access. With the cloud-service based access enabled, any access to the key vault requires approval from groups in the organization that have specific roles, as described above with reference to FIG. 3. For example, at least one approver needs to be a workload administrator, at least one approver needs to be compliance administrator, and/or at least one approver needs to be a crypto administrator.

At operation 403, the customer administrator sends a request to the service system 210 to create the policy 212 using the customer keys 202, 204. In some example embodiments, a Uniform Resource Identifier (URI) is sent to the service system 210 for each of the customer keys 202, 204, where a URI is a string that provides a unique address (either on the Internet or on another private network) where a resource can be found.

At operation 404, the service system 210 obtains the metadata for the customer keys 202, 204 and validates that the key vault has cloud-service access set up and that one or more approvers are defined in the policy. If the conditions for creating the policy 212 are satisfied, at operation 405, the service system 210 activates and stores the policy 212. In the example illustrated in FIG. 4, there is no availability key so the customer key itself is protected.

In some example embodiments, some customers do not wish to give the availability key to the service provider (e.g., to meet financial compliance requirements), and the availability key is a still created but it is maintained by administrators of the customer, that is, one or more administrators of the customer are the approvers for changes to the availability key. In a way, is like having three Customer Keys by the customer kept in the key vault.

Typically, the availability key is used (by the service provider or by the customer who owns it) when the customer keys 202, 204 are inaccessible either due to transient issues or to permanent errors, where keys have been mishandled by the customer, intentionally or unintentionally.

Without the availability key owned by the service provider, there is no possibility of recovering the customer data if the customer keys are mishandled. By having the availability key, the customer is protected against potentially fatally destructive actions affecting the customer keys 202, 204.

In some example embodiments, permissions are managed in the Azure active directory. These are Azure roles in the Azure active directory for the customer. In some example embodiments, permissions are granted using role assignments, where an entity with the role assignment is given the permission. For an administrator to get that particular role assignment, the administrator has to go through the approval process. Without the approval, the administrator will not be able to perform operations on the resource, because the administrator is not able to obtain the role assignment to perform the actions.

One scenario for management of keys is when the customer wants to do a complete data purge of the data. Since the customer controls the key vault, and the root keys kept inside, the customer may delete all the keys from the key vault, and the customer will be assured that the data cannot be accessed anymore since the decryption key is no longer available (because there are no root keys left to recover the data encryption key).

Figure 5:
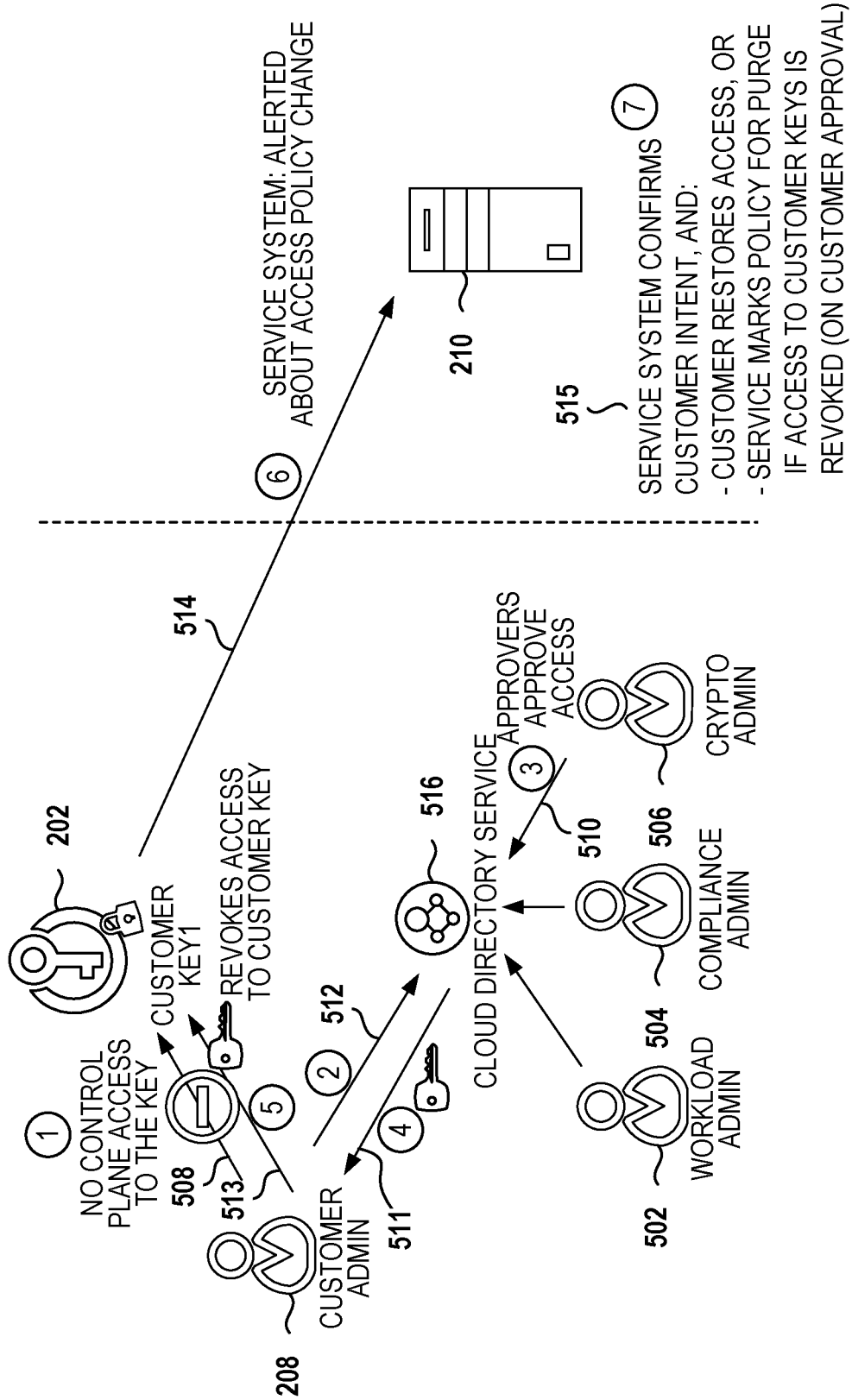
FIG. 5 illustrates the approval workflow to grant access to the key, according to some example embodiments.

FIG. 5 illustrates access to the key vault for updating the policy, according to some example embodiments. During normal operation 508, no administrator, including the customer administrator for the key vault, has access to the key vault for making changes restricted through PIM, such as changing the customer key 202.

When the customer administrator 208 wants to make changes to the key vault, the customer administrator 208 sends a request 512 to the cloud directory service 516 (e.g., PIM, but other cloud directory services may be used).

The cloud directory service 516 sends notifications to all the approvers identified in the policy for the customer. The notifications may be sent via multiple ways, such as emails, text messages, phone calls, and so forth. In the illustrated example, there are three approvers: workload administrators 502, compliance administrator 504, and crypto administrator 506, but other embodiments may include a different number of approvers.

The cloud directory service 516 monitors the activities from the approvers and provides utilities for entering the approval by the approvers, such as user interfaces, emails, text messages, and so forth. The cloud directory service 516 keeps a list of all the approvers required to complete the approval and the status of the approval from each approver (approved/pending approval).

In some example embodiments, the approval process may be performed in parallel, where each approver can approve the request at any time, but in other example embodiments, an order list is used to obtain the approval in an order defined by the policy, such that one approver will not get notified until the previous approver has approved, until all the approvers have completed the approval process.

Once all the approvers have approved the request (operation 510), the cloud directory service 516 sends (operation 511) a notification to the customer administrator 208 that the approval has been given. The approval includes a limited amount of time during which the customer administrator 208 may perform operations on the key vault. After the expiration of the allowed period of time, the approval is automatically revoked.

Some of the activities allowed include deleting the key vault, adding or deleting a customer root key, adding or deleting an administrator key, and changing the policy (e.g., changing the list of approvers).

At operation 513, the customer administrator performs operations on the key vault. In the illustrated example, the customer administrator 208 revokes access to the customer key 202 for the cloud directory service.

Once the customer administrator 208 performs the operation on the key vault, the cloud directory service 516 sends (operation 514) a notification, to the system 210, to inform of the policy change.

At operation 515, the service system 210 confirms the customer request and completes the request, such as revoking access to the customer key. If the access to both customer keys has been revoked, the service system 210 will mark the policy for purge to terminate the customer service for storage. It is noted that if all keys are taken out of the key vault, then all stored data will become unavailable.

In some example embodiments, the process is implemented via Azure roles and role assignments, as well as a feature of Azure called deny assignments. The deny assignment is created at the time customer provisions and configures the key vault that needs to be protected. That is, before policy creation. That way the deny assignment denies access to everyone. At the time the customer admin 208 obtains the approval, the customer admin gets an exclusion on the deny assignment for a limited time period. The admin 208 gets access through the exclusion to the deny assignment.

After the customer administrator 208 obtains the approvals that provide access to the destructive actions on the key vault, there will be an explicit deny on those actions using a deny assignment that applies to everyone in the organization. With the deny assignment in place, even if an administrator has the required role for managing the service, the administrator will be denied the permissions associated with the role. When the customer administrator 208 goes through the approval workflow and obtains the approval, an exclusion will be added for that customer administrator 208 over the deny assignment, to give the customer administrator 208 the required permissions.

Figure 6:
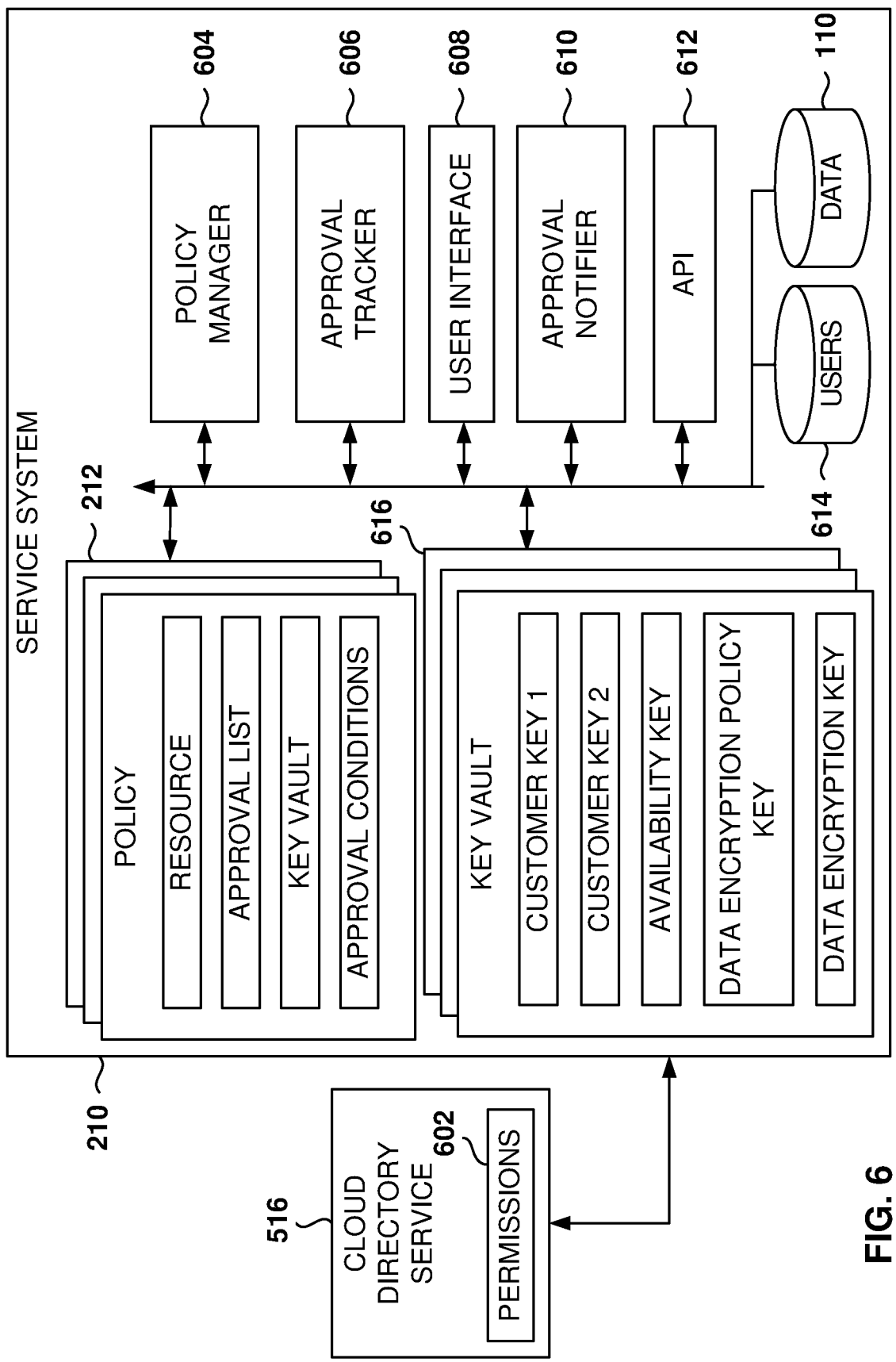
FIG. 6 illustrates a service system for implementing example embodiments.

FIG. 6 illustrates a service system 210 for implementing example embodiments. In one example embodiment, the service system 210 includes a policy manager 604, an approval tracker 606, a user interface 608, a preliminary notifier 610, and Application Programming Interface (API) 612, and storage for policies 212, key vaults 616, user's database 614, and user data 110.

The policy manager 604 supervises the operations associated with the approval process, such as creating policies, providing approval for destructive actions, and so forth. The approval tracker 606 manages the approval process for performing operations associated with data keys, including sending notifications to approvers when an approval is requested, tracking the approval by the approvers, and notifying the policy manager 604 when the approval succeeds or fails. Further, the approval tracker 606 manages the time boundaries provided for performing operations on the management of keys.

The user interface 608 is provided to access features of the service by an administrator, such as entering approvals, configuring a new client, and so forth. Additionally, the features of the service may also be accessed through the API 612.

The approval notifier 610 is in charge of sending approval requests to the approvers when necessary, such as by sending emails, text messages, pages, phone calls, and the like. The user's database 614 contains information about users, such as service details, identity of user administrators, and so forth.

Each policy 212 includes information defined the encryption hierarchy to encrypt data using each of the customer keys as well as the availability key protected by the service. Further, the policy 212 includes metadata identifying resources being managed, approvers, key vault, and approval conditions (e.g., maximum amount of time permission given). Additionally, the policy 212 may include log information regarding the activities performed on the policy 212, such as creation, changes, and the like. The key vaults 616 hold the keys associated with the policy 212.

The service system 210 interacts with a cloud directory service 516, which includes a mechanism for managing permissions 602 for accessing critical resources, such as the encryption keys, as described above with reference to FIGS. 3 and 5.

It is to be noted that the embodiments illustrated in FIG. 6 are examples and do not describe every possible embodiment. Other embodiments may utilize different modules or additional modules, combine the functionality of two or more modules into a single module, and so forth. The embodiments illustrated in FIG. 6 should therefore not be interpreted to be exclusive or limiting, but rather illustrative.

Figure 7:
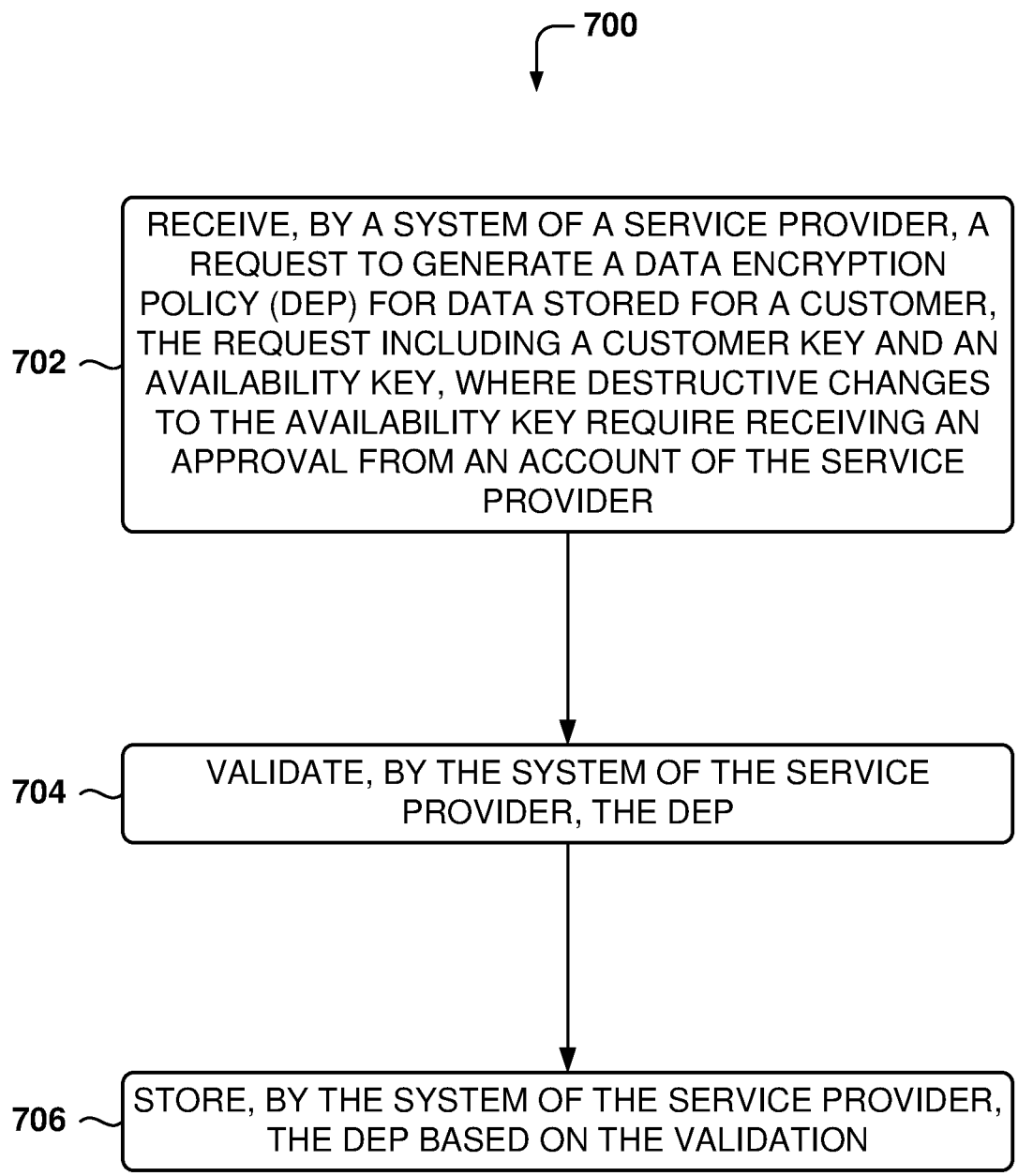
FIG. 7 is a flowchart of a method for protecting restricted actions on encryptions keys that control the management of data stored by a service provider, according to some example embodiments.

FIG. 7 is a flowchart of a method 700 for protecting restricted actions on encryption keys that control the management of data stored by a service provider, according to some example embodiments, for performing damage simulations. While the various operations in this flowchart are presented and described sequentially, one of ordinary skill will appreciate that some or all of the operations may be executed in a different order, be combined or omitted, or be executed in parallel.

At operation 702, the system of the service provider receives a request to generate a DEP for data stored by the system of the service provider for a customer, with the request including references to customer keys and availability key. The DEP defines how encryption and decryption is performed for the data. The customer key and the availability key are root keys for encrypting a data encryption key. The data encryption key is used to encrypt the data stored by the service provider for the customer. Destructive changes to the availability key require receiving an approval from an account of the service provider.

From operation 702, the method flows to operation 704, where the system of the service provider validates the DEP.

From operation 704, the method flows to operation 706, where the system of the service provider stores the DEP based on the validation.

In one example, the method 700 further comprises: receiving a destructive request to purge the DEP; tracking, by a directory service of the system, approvals from a plurality of user accounts to purge the DEP; tracking, by the system, approval from the account of the service provider to purge the DEP; and purging the DEP based on the approvals from the plurality of user accounts and the account of the service provider.

In one example, the method 700 further comprises: detecting a request for access to the customer key; sending requests, by a directory service of the system, to a plurality of user accounts for approval of the request for access; and approving the request for access when the plurality of user accounts approve the request for access.

In one example, the request for access is approved for a predetermined amount of time and the approval is revoked after an expiration of the predetermined amount of time.

In one example, the method 700 further comprises: detecting, by the system, a request for accessing the availability key; sending a notification to an account of the service provider for the request for accessing the availability key; and approving the request for accessing the availability key when the account of the service provider approves the request.

In one example, the method 700 further comprises: encrypting the encryption key with the customer key to obtain a first encrypted encryption key, encrypting the encryption key with the availability key to obtain a second encrypted encryption key, and storing the first encrypted encryption key and the second encrypted encryption key under the DEP. The system provides control of the customer key to the customer and provides control of the availability key to the service provider.

In one example, the DEP includes the customer key, the availability key, and a key vault for storing the customer key and the availability key.

In one example, validating the DEP comprises: validating that the key vault is configured for access; and validating that access to the customer key requires a plurality of approvals.

In one example, the system comprises: a policy manager for managing an approval process; an approval tracker for tracking pending approvals; and an approval notifier for sending requests for approval.

In one example, destructive changes to the customer key require receiving approval from a plurality of customer accounts.

In one example, the method 700 further comprises providing, by the system, a user interface for entering approvals.

Another general aspect is for a system that includes a memory comprising instructions and one or more computer processors. The instructions, when executed by the one or more computer processors, cause the one or more computer processors to perform operations comprising receiving a request to generate a DEP for data stored by the system of the service provider for a customer, the request including a reference to a customer key and an availability key. The customer key and the availability key are root keys for encrypting a data encryption key. The data encryption key is used to encrypt the data stored by the service provider for the customer. Destructive changes to the availability key require receiving an approval from an account of the service provider. Further, the instructions include validating the DEP, and storing the DEP based on the validation.

In yet another general aspect, a machine-readable storage medium (e.g., a non-transitory storage medium) includes instructions that, when executed by a machine, cause the machine to perform operations comprising receiving a request to generate a DEP for data stored by the system of the service provider for a customer, the request including a reference to a customer key and an availability key. The customer key and the availability key are root keys for encrypting a data encryption key. The data encryption key is used to encrypt the data stored by the service provider for the customer. Destructive changes to the availability key require receiving an approval from an account of the service provider. Further, the instructions include validating the DEP, and storing the DEP based on the validation.

Figure 8:
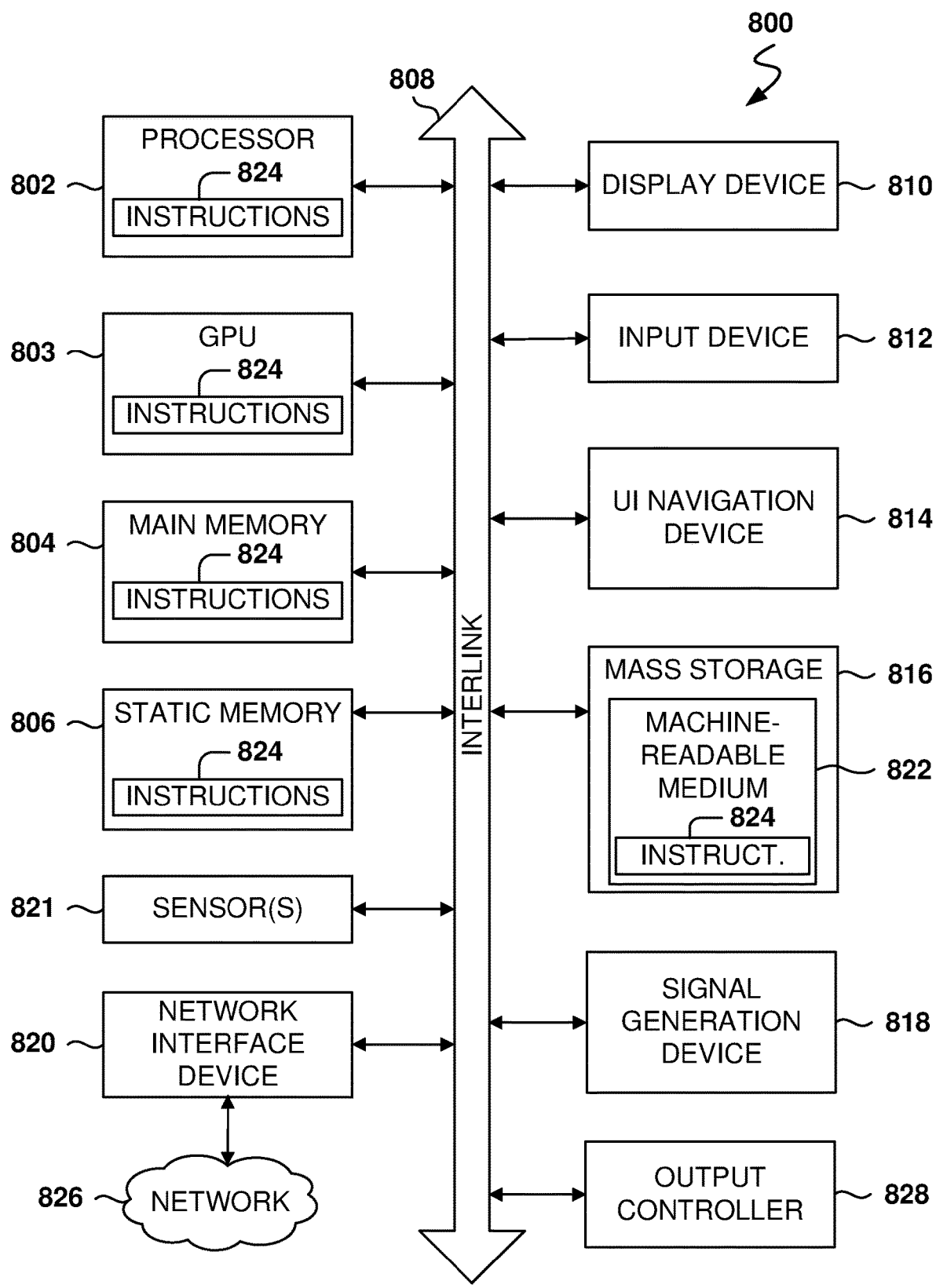
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, by a server of a service provider and from a customer administrator, a request to revoke use of an availability key of a customer for accessing data stored by the server, the availability key being a root key for encrypting a data encryption key;
   sending, by the server of the service provider, a notification to at least one approver of the customer requesting approval for the request to revoke the use of the availability key;
   upon receiving approval from the at least one approver, sending a request to a system approver of the service provider requesting approval for the request to revoke the use of the availability key;
   upon receiving approval from the system approver, providing access to the customer administrator to a key vault to perform a destructive operation to a customer key, the customer key being another root key for encrypting the data encryption key; and
   upon detecting completion of the destructive operation by the customer administrator, purging a customer policy for accessing the data stored by the server.

2. The method as recited in claim 1, wherein purging the customer policy further comprises:
   performing a data purge of the data stored by the server for the customer.

3. The method as recited in claim 1, wherein the availability key is inaccessible until the approval from the at least one approver and the approval from the system approver.

4. The method as recited in claim 1, wherein the at least one approver of the customer comprises a plurality of approvers, wherein the approval from the at least one approver requires approval from the plurality of approvers.

5. The method as recited in claim 1, wherein providing access to the customer administrator to a key vault further comprises:
   providing time-bound access to the key vault.

6. The method as recited in claim 1, wherein the service provider has to approve changes to the availability key even if the customer owns the availability key.

7. The method as recited in claim 1, wherein having the service provider validate an intent of the destructive operations provides extra protection to the customer against error.

8. The method as recited in claim 1, wherein the customer is able to have control of the data while the service provider does not have access to the availability key, and the customer benefits from the approval from the system approver.

9. The method as recited in claim 1, further comprising:
   encrypting the encryption key with the customer key to obtain a first encrypted encryption key;
   encrypting the encryption key with the availability key to obtain a second encrypted encryption key; and
   storing the first encrypted encryption key and the second encrypted encryption key, wherein the system provides control of the customer key to the customer and provides control of the availability key to the service provider.

10. The method as recited in claim 1, further comprising:
    providing, by the system, a user interface for entering approvals.

11. A system comprising:
    a memory comprising instructions; and
    one or more computer processors, wherein the instructions, when executed by the one or more computer processors, cause the system to perform operations comprising:
    receiving, by a server of a service provider and from a customer administrator, a request to revoke use of an availability key of a customer for accessing data stored by the server, the availability key being a root key for encrypting a data encryption key;
    sending, by the server of the service provider, a notification to at least one approver of the customer requesting approval for the request to revoke the use of the availability key;
    upon receiving approval from the at least one approver, sending a request to a system approver of the service provider requesting approval for the request to revoke the use of the availability key;
    upon receiving approval from the system approver, providing access to the customer administrator to a key vault to perform a destructive operation to a customer key, the customer key being another root key for encrypting the data encryption key; and
    upon detecting completion of the destructive operation by the customer administrator, purging a customer policy for accessing the data stored by the server.

12. The system as recited in claim 11, wherein purging the customer policy further comprises:
    performing a data purge of the data stored by the server for the customer.

13. The system as recited in claim 11, wherein the availability key is inaccessible until the approval from the at least one approver and the approval from the system approver.

14. The system as recited in claim 11, wherein the at least one approver of the customer comprises a plurality of approvers, wherein the approval from the at least one approver requires approval from the plurality of approvers.

15. The system as recited in claim 11, wherein providing access to the customer administrator to a key vault further comprises:
    providing time-bound access to the key vault.

16. A tangible machine-readable storage medium including instructions that, when executed by a machine, cause the machine to perform operations comprising:
    receiving, by a server of a service provider and from a customer administrator, a request to revoke use of an availability key of a customer for accessing data stored by the server, the availability key being a root key for encrypting a data encryption key;
    sending, by the server of the service provider, a notification to at least one approver of the customer requesting approval for the request to revoke the use of the availability key;
    upon receiving approval from the at least one approver, sending a request to a system approver of the service provider requesting approval for the request to revoke the use of the availability key;
    upon receiving approval from the system approver, providing access to the customer administrator to a key vault to perform a destructive operation to a customer key, the customer key being another root key for encrypting the data encryption key; and
    upon detecting completion of the destructive operation by the customer administrator, purging a customer policy for accessing the data stored by the server.

17. The tangible machine-readable storage medium as recited in claim 16, wherein purging the customer policy further comprises:
    performing a data purge of the data stored by the server for the customer.

18. The tangible machine-readable storage medium as recited in claim 16, wherein the availability key is inaccessible until the approval from the at least one approver and the approval from the system approver.

19. The tangible machine-readable storage medium as recited in claim 16, wherein the at least one approver of the customer comprises a plurality of approvers, wherein the approval from the at least one approver requires approval from the plurality of approvers.

20. The tangible machine-readable storage medium as recited in claim 16, wherein providing access to the customer administrator to a key vault further comprises:
providing time-bound access to the key vault.

* * * * *